United States Patent
Pinto et al.

(10) Patent No.: US 12,174,762 B2
(45) Date of Patent: *Dec. 24, 2024

(54) MECHANISM TO AUTONOMOUSLY MANAGE SSDs IN AN ARRAY

(71) Applicant: Samsung Electronics Co., Ltd., Suwon-si (KR)

(72) Inventors: Oscar P. Pinto, San Jose, CA (US); Robert Brennan, Santa Clara, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,711

(22) Filed: Sep. 27, 2023

(65) Prior Publication Data

US 2024/0020247 A1    Jan. 18, 2024

Related U.S. Application Data

(63) Continuation of application No. 17/734,908, filed on May 2, 2022, now Pat. No. 11,775,454, which is a
(Continued)

(51) Int. Cl.
*G06F 13/12* (2006.01)
*G06F 13/16* (2006.01)

(52) U.S. Cl.
CPC .. *G06F 13/1668* (2013.01); *G06F 2213/0026* (2013.01)

(58) Field of Classification Search
CPC .................... G06F 13/1668; G06F 2213/0026
See application file for complete search history.

(56) References Cited

U.S. PATENT DOCUMENTS

| 5,325,489 A | 6/1994 | Mitsuhira et al. |
| 7,334,076 B2 | 2/2008 | Hendel et al. |

(Continued)

FOREIGN PATENT DOCUMENTS

| CN | 101025979 A | 8/2007 |
| CN | 101187849 A | 5/2008 |

(Continued)

OTHER PUBLICATIONS

Korean Office Action dated Nov. 27, 2023, issued in Korean Patent Application No. 10-2018-0154812 (7 pages).

(Continued)

*Primary Examiner* — Cheng Yuan Tseng
(74) *Attorney, Agent, or Firm* — Lewis Roca Rothgerber Christie LLP

(57) ABSTRACT

Embodiments of the present invention include a drive-to-drive storage system comprising a host server having a host CPU and a host storage drive, one or more remote storage drives, and a peer-to-peer link connecting the host storage drive to the one or more remote storage drives. The host storage drive includes a processor and a memory, wherein the memory has stored thereon instructions that, when executed by the processor, causes the processor to transfer data from the host storage drive via the peer-to-peer link to the one or more remote storage drives when the host CPU issues a write command.

20 Claims, 5 Drawing Sheets

Related U.S. Application Data continuation of application No. 15/957,773, filed on Apr. 19, 2018, now Pat. No. 11,321,249.

(60) Provisional application No. 62/648,292, filed on Mar. 26, 2018.

(56) References Cited

U.S. PATENT DOCUMENTS

| | | | |
|---|---|---|---|
| 7,660,943 B2 | 2/2010 | Goodman et al. | |
| 9,294,567 B2 | 3/2016 | Hussain et al. | |
| 9,331,955 B2 | 5/2016 | Talpey et al. | |
| 9,459,798 B2 | 10/2016 | He et al. | |
| 9,817,607 B1 | 11/2017 | Harvey | |
| 9,892,071 B2 * | 2/2018 | Dreier | G06F 13/28 |
| 10,037,296 B2 | 7/2018 | Breakstone et al. | |
| 10,079,889 B1 | 9/2018 | Malwankar et al. | |
| 10,102,159 B2 | 10/2018 | Nimmagadda | |
| 10,216,666 B2 | 2/2019 | Shalom et al. | |
| 10,223,313 B2 | 3/2019 | Shih | |
| 10,241,943 B2 | 3/2019 | Nale et al. | |
| 10,423,487 B2 | 9/2019 | Marripudi et al. | |
| 10,651,975 B2 | 5/2020 | Gladwin et al. | |
| 10,678,433 B1 | 6/2020 | Kirkpatrick | |
| 11,138,103 B1 | 10/2021 | Shi et al. | |
| 11,269,669 B2 | 3/2022 | Chou et al. | |
| 11,321,249 B2 * | 5/2022 | Pinto | G06F 3/067 |
| 11,385,792 B2 | 7/2022 | Niven et al. | |
| 11,775,454 B2 * | 10/2023 | Pinto | G06F 13/28 709/228 |
| 2003/0167312 A1 | 9/2003 | Mori | |
| 2014/0181435 A1 | 6/2014 | Privitt et al. | |
| 2015/0026368 A1 | 1/2015 | Kagan et al. | |
| 2015/0254088 A1 | 9/2015 | Chou et al. | |
| 2015/0261434 A1 | 9/2015 | Kagan et al. | |
| 2015/0278246 A1 | 10/2015 | Toyama et al. | |
| 2016/0026395 A1 | 1/2016 | Lee | |
| 2016/0127492 A1 | 5/2016 | Malwankar et al. | |
| 2016/0188500 A1 | 6/2016 | Morris et al. | |
| 2016/0266827 A1 | 9/2016 | Hasegawa et al. | |
| 2016/0357443 A1 | 12/2016 | Li et al. | |
| 2017/0024334 A1 | 1/2017 | Bergsten et al. | |
| 2017/0300433 A1 | 10/2017 | Benedict et al. | |
| 2017/0357609 A1 | 12/2017 | Long et al. | |
| 2018/0009587 A1 | 1/2018 | Mosser et al. | |
| 2018/0027680 A1 | 1/2018 | Kumar et al. | |
| 2018/0189207 A1 | 7/2018 | Nale et al. | |
| 2018/0341606 A1 | 11/2018 | Bolkhovitin et al. | |
| 2019/0018809 A1 | 1/2019 | Nale et al. | |
| 2019/0034306 A1 * | 1/2019 | Wysocki | G06F 11/2094 |
| 2019/0250852 A1 | 8/2019 | Kabra et al. | |
| 2019/0294339 A1 | 9/2019 | Bolkhovitin et al. | |

FOREIGN PATENT DOCUMENTS

| | | |
|---|---|---|
| CN | 104025060 A | 9/2014 |
| CN | 106462114 A | 2/2017 |
| CN | 106557429 A | 4/2017 |
| CN | 106688217 A | 5/2017 |
| JP | 2002-91897 A | 3/2002 |
| JP | 2005-293435 | 10/2005 |
| JP | 2014-528107 A | 10/2014 |
| JP | 2015-537310 A | 12/2015 |
| JP | 2016-170696 A | 9/2016 |
| JP | 2017-512350 A | 5/2017 |
| KR | 2000-0021045 | 4/2000 |
| KR | 10-2018-0010951 A | 1/2018 |
| KR | 10-2018-0020877 A | 2/2018 |
| TW | 201546717 A | 12/2015 |
| TW | 201720123 A | 6/2017 |
| TW | 201732622 A | 9/2017 |
| WO | WO 2017/040706 A1 | 3/2017 |

OTHER PUBLICATIONS

Chinese Office Action dated Dec. 23, 2023, issued in Chinese Patent Application No. 201910223119.8 (8 pages).

* cited by examiner

MECHANISM TO AUTONOMOUSLY MANAGE SSDs IN AN ARRAY

CROSS-REFERENCE TO RELATED APPLICATION(S)

This application is a continuation of U.S. patent application Ser. No. 17/734,908, filed May 2, 2022, which is a continuation of U.S. patent application Ser. No. 15/957,773, filed Apr. 19, 2018, now U.S. patent Ser. No. 11/321,249, issued May 3, 2022, which claims the benefit of U.S. Provisional Patent Application Ser. No. 62/648,292, filed Mar. 26, 2018, the entire content of all of which are incorporated by reference herein.

BACKGROUND

Modern enterprise data storage systems store substantial amounts of important data. Such data requires protective measures to prevent data loss as a consequence of storage device failures. Usually, one or more controlling entities perform a multiplicity of protection methods that achieve this objective. These entities are often storage server unit central processing units (CPUs).

From a storage device perspective, storage server CPUs perform the storage and protection methods in a supervisory manner and the storage devices participate as strictly subordinate devices. By construction, the controlling entities typically use policy-based criteria to determine what data is stored on which subordinate storage devices under their control.

Transfer activities between the CPU and storage devices involve at least local CPU caches and dynamic random access memory (DRAM) along the data transfer path, as well as the use of network resources. Thus, performing such CPU-controlled data protection methods typically consumes substantial storage server resources. CPU involvement in data transfers can result in latency as a result of CPU cache pollution, significant DRAM usage, synchronization software workloads, and additional processing.

Meanwhile, storage devices often have available, unused resources and capabilities. For example, solid-state drives (SSDs), in particular Non-Volatile Memory Express (NVMe) SSDs, have relatively large amounts of DRAM that are used for different functions. For example, DRAM for NVMe SSDs is used to host read/write buffers, is used for internal SSD metadata storage and is used to host the control memory buffer. The control memory buffer is a portion of an SSD's DRAM that the SSD exposes to hosts for input/output (I/O) memory queues, data buffers, etc.

An improved storage device and drive-to-drive storage method is needed that can perform autonomous data storage and data protection services without involving a CPU or other controlling entity. Further, an improved storage device and drive-to-drive storage method is needed that can take advantage of the unused resources and capabilities of the storage device. Such improved storage devices and methods can reduce the amount of host resources needed for data protection and backup.

The above information disclosed in this Background section is only for enhancement of understanding of the background of the disclosure and therefore it may contain information that does not constitute prior art.

SUMMARY

Embodiments of the present invention include a drive-to-drive storage system comprising a host server having a host CPU and a host storage drive, one or more remote storage drives, and a peer-to-peer link connecting the host storage drive to the one or more remote storage drives. The host storage drive includes a processor and a memory, wherein the memory has stored thereon instructions that, when executed by the processor, causes the processor to transfer data from the host storage drive via the peer-to-peer link to the one or more remote storage drives when the host CPU issues a write command.

Further embodiments include a host storage drive including a peer-to-peer link connecting the host storage drive to one or more remote storage drives, and a processor and a memory, wherein the memory has stored thereon instructions that, when executed by the processor, causes the processor to transfer data from the host storage drive via the peer-to-peer link to the one or more remote storage drives.

Additional embodiments include a method for storing data using a drive-to-drive storage system, wherein the drive-to-drive storage system includes a host server having a host CPU and a host storage drive, the host storage drive having a processor and memory, one or more remote storage drives, and a peer-to-peer link connecting the host storage drive to the one or more remote storage drives. The method includes initiating a write command to write data to the host storage drive, sending the data to the memory of the host storage drive using direct memory access, and transferring the data from the memory of the host storage drive to the one or more remote storage drives via the peer-to-peer link.

BRIEF DESCRIPTION OF THE DRAWINGS

Further features and aspects will become apparent and will be best understood by reference to the following detailed description reviewed in conjunction with the drawings. In the drawings.

DETAILED DESCRIPTION

Figure 1:
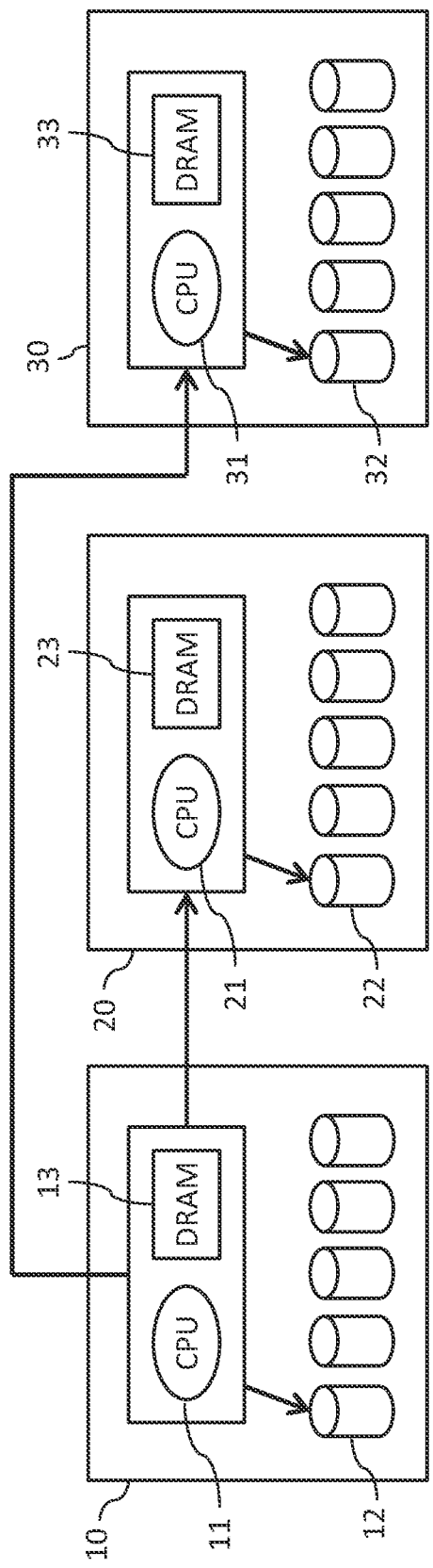
FIG. 1 is a schematic diagram of a CPU controlled system for data protection.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

The use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments of the present invention include a storage device (e.g., a host storage device) that is aware of its connectivity as a storage device to a host CPU and is aware of its connectivity to one or more storage device(s). Embodiments of the host storage device can initiate a direct peer-to-peer transfer of data to one or more remote storage devices to provide policy-based autonomous data transfer services. This effectively offloads the host CPU from performing additional I/O to provide replication and other data protection services to the host storage device, reducing host CPU computing requirements and lowering storage system latency due to reduced storage server CPU involvement in data transfers. Some embodiments offload specific storage protocols from a CPU-to-SSD method to a storage device to an SSD-to-SSD method. Further embodiments provide an opportunity to define native storage device to storage device vendor-defined (private) methods. In addition, further embodiments include a storage device that enables a push or pull model to synchronize write traffic between storage devices for data protection purposes.

FIG. 1 is a system for data protection in which CPUs of storage servers control the storage of data. In FIG. 1, nodes 10, 20 and 30 are storage servers. Each node 10, 30 includes a CPU 11, 21, 31, DRAM 13, 23, 33, and one or more storage drives 12, 22, 32. The one or more storage drives 12, 22, 32 may be connected to their respective CPU 11, 21, 31 via a secondary port if the storage drive 12, 22, 32 is a dual-port storage device, a PCIe switch fabric, a network fabric, or other suitable connector.

To store data, the CPU 11 of node 10 issues a write command to local drive 12 of node 10. The data to be stored is first cached in local DRAM 13 of node 10 before being stored on the local drive 12.

Simultaneous to storage on the local drive 12, the CPU 11 of node 10 initiates a write to remote drive 22 of node 20 with the same data to fulfill policy-based replication requirements. The CPU 11 of node 10 initiates the CPU 21 of node 20 to store the data. The CPU 21 issues a write command to the drive 22 via CPU 21. The data is first cached in a local DRAM 23 of node 20 before being stored in the local drive 22. In other embodiments, a second write may be configured with dual port drive(s) where the CPU 21 of node 20 is not involved.

Additionally, the CPU 11 of node 10 may commit the data to additional drives on node 30. The CPU 11 may initiate the CPU of node 30 which then writes the data to its local drive 32 according to the same process as for node 20.

In the process according to FIG. 1, the server CPUs 11, 21, and 31 orchestrate the data transfer. Thus, the transfer activities involve local CPU caches and DRAM along the data transfer path and require CPU power usage for storage across the various local drives. In addition, further software may be required to synchronize the storage of data across the various nodes. For example, storage server software may coordinate both ends of the replication process in order to provide synchronous and asynchronous functionality.

Figure 2:
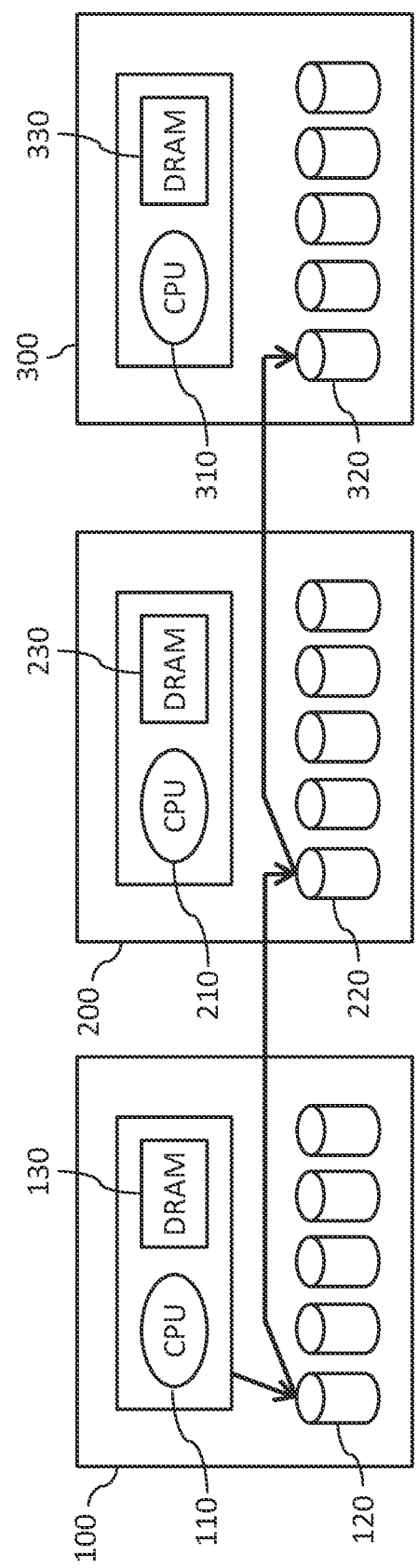
FIG. 2 is a schematic diagram of a drive-to-drive storage system according to an embodiment of the present invention.

FIG. 2 is a schematic diagram of a drive-to-drive storage system according to an embodiment of the present invention. In FIG. 2, nodes 100, 200 and 300 are storage servers. Each node 100, 200 and 300 includes a CPU 110, 210, 310, DRAM 130, 230, 330, and one or more storage drives 120, 220, 320. In some embodiments, the one or more storage drives 120, 220, 320 may be SSDs. In further embodiments, the one or more storage drives 120, 220, 320 may be NVMe SSDs. In some embodiments, CPUs 210, 310 and DRAM 230, 330 may be excluded and nodes 200, 300 may only include storage drives 220, 320.

The one or more storage drives 120, 220, 320 may be connected to their respective CPU 110, 210, 310, for example, via a secondary port if the storage drive 120, 220, 320 is a dual-port storage device, a PCIe switch fabric, a network fabric, or other suitable connector. In addition, the storage drives 120, 220, 320 can be connected to each other in a PCIe direct configuration, a switch fabric configuration or any other configuration in which the storage drives 120, 220, 320 are connected peer-to-peer. In some embodiments, the storage drives 120, 220, 320 can be connected to each other via a dedicated port or a reprogrammed switch port. The storage drives 120, 220, 320 can communicate using either existing protocols or vendor specific implementations.

These connections and communication protocols as part of the peer-to-peer configuration can drive direct memory access (DMA) requests and synchronization between the storage drives 120, 220, 320, as described below. The storage drives 120, 220, 320 can expose additional configuration options to be configured for peer-to-peer connectivity. Examples of such a configuration control path are get or set log_page (peer_config). This will be a new log page defined specifically for peer-to-peer logic. In some embodiments, the existing, well-known and standardized log page, the SMART log page, may be used. The connections and communication protocols as part of the peer-to-peer configuration can allow the storage drives 120, 220, 320 to communicate between each other, to be configured in dual mode, to share hardware resources enabling data transfers, and to provide a transport and signaling mechanism that may, in some embodiments, be vendor specific.

Figure 3:
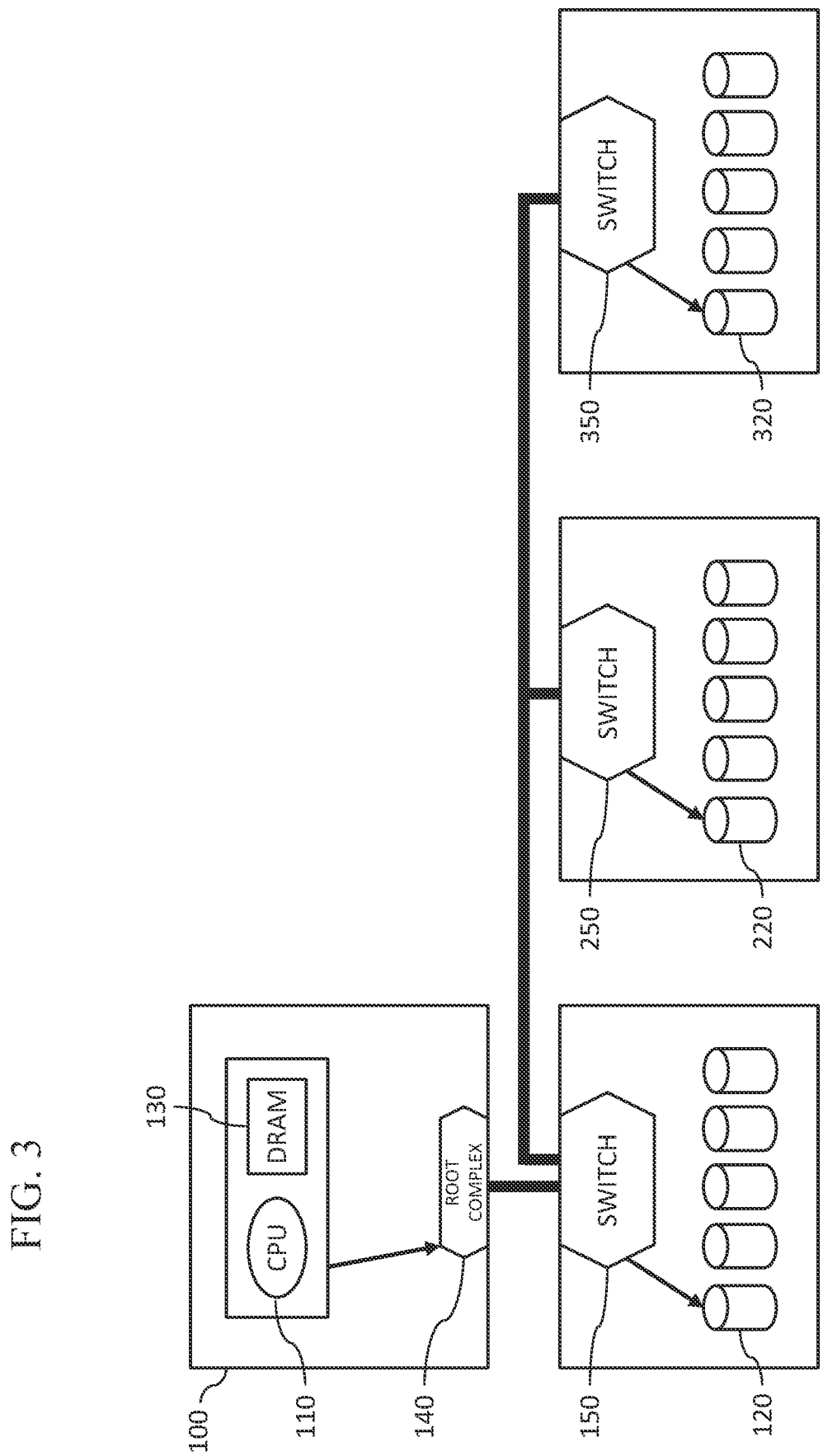
FIG. 3 is a schematic diagram of an embodiment of FIG. 2 in which storage drives in the storage system are connected via a dedicated port or a reprogrammed switch port.

FIG. 3 is a schematic diagram of an embodiment of FIG. 2 in which the storage drives 120, 220, 320 are connected via a dedicated port or a reprogrammed switch port. In this configuration, the remote drives 220, 320 may be attached to separate CPUs 210, 310; however, as shown in FIG. 3, they need not have separate CPUs. (The drives 220, 320 are termed as remote drives because they are not directly connected to the host CPU, but are instead connected to the host CPU 110 either through their own respective CPUs 220, 320 or through another storage drive, such as the storage drive 120.) In this embodiment, the storage server 100 includes a root complex device 140 that connects the storage server 100 to a switch 150, which is connected to the host storage drive 120. The switch 150 is also connected to switches 250, 350 connected to storage drives 220, 320, respectively. The switches 150, 250, 350 may be PCIe switches or other suitable dedicated or reprogrammed switch ports. The switches 150, 250, 350 should support Access Control Services (ACS), if, for example, PCIe switches are used, or a suitable communication protocol to allow the storage drives 120, 220, 320 to communicate with one another and to share hardware resources for data transfers. For example, if the switches 150, 250, 350 are network switches in a network fabric configuration, the drives 120, 220, 320 can be network attached directly to each other through a network protocol instead of PCIe. Memory accesses for synchronization in such an embodiment would be network memory mapped.

Once connected in the peer-to-peer link, the storage drives 120, 220, 320 of FIGS. 2 and 3 can communicate to perform policy-based data transfers. This, in essence, creates a quality of service (QoS) channel between the storage drives 120, 220, 320, as they are able to transfer data directly to each other.

In one embodiment, the CPUs 110, 210, 310 can manage the peer-to-peer connection between the storage drives 120, 220, 320 in a top-down configuration. For example, the CPU 110, 210, 310 for a respective storage drive 120, 220, 320 can manage the drive's peer access for pairing. The CPU 110, 210, 310 can also program associated switches 150, 250, 350 between the storage drives 120, 220, 320 to allow for a peer-to-peer connection through the communication protocol used, for example, ACS, if PCIe switches are used. Or, if the storage drives 120, 220, 320 are on a network (e.g., in a switch fabric configuration), the CPU 110, 210, 310 can program the network switches to allow for a peer-to-peer connection. In some embodiments, the CPU 110 can use a set log_page (peer_config) command to the storage drives 120, 220, 320 to instruct the storage drives 120, 220, 320 regarding their peer connectivity and the protection group. This command is managed by the host CPU 110 and implemented in the drive and may only be required in the top-down configuration. The CPU 110, 210, 310 for a respective storage drive 120, 220, 320 may also manage error paths.

In an alternative embodiment, the storage drives 120, 220, 320 can manage the peer-to-peer connection between the storage drives 120, 220, 320 in a bottom-up configuration. The storage drives 120, 220, 320 can elect or otherwise provide a master controller with subordinate remote drives to form a self-managed cluster, for example, in a RAID formation. In some embodiments, storage drive 120 (hereafter referred to as the host drive 120) can act as a master controller for subordinate storage drives 220, 320. The host drive 120 can consolidate storage pool resources providing one management view and, if desired, one address range. Software on the CPU 110 can program the host drive 120 once the host drive 120 is on the cluster chain. In some embodiments, the log_page command can specify and identify which drive is the host drive 120 and which are remote storage drives 220, 320.

In some embodiments of the bottom-up configuration, the host drive 120 can control data flow and may include data in its local path or may push data from the CPU 110 directly to end storage devices 220, 320. An embodiment of the push model may use a RAID configuration. In such an embodiment, the host drive 120 connected to the CPU 110 acts as the master controller that abstracts the LBA space and data movement. With EC/RAID0/5, some LBA space will be local to the host drive 120 while other LBA space is on remote storage drives 220, 320. The data that is local will be written to the host drive 120 while data in LBA ranges that are on remote storage drives 220, 320 will be pushed to them. Here the host drive 120 orchestrates the data movement.

In other embodiments, the remote drives 220, 320 can pull data to themselves. An embodiment of this pull model may use a RAID1 (replication) configuration in which control messages are pushed to the storage drives 120, 220, 320 and the data is pulled in by the remote storage drives 220, 320.

Both the push and pull models synchronize the write traffic as per the data flow from the host CPU 110.

Figure 4:
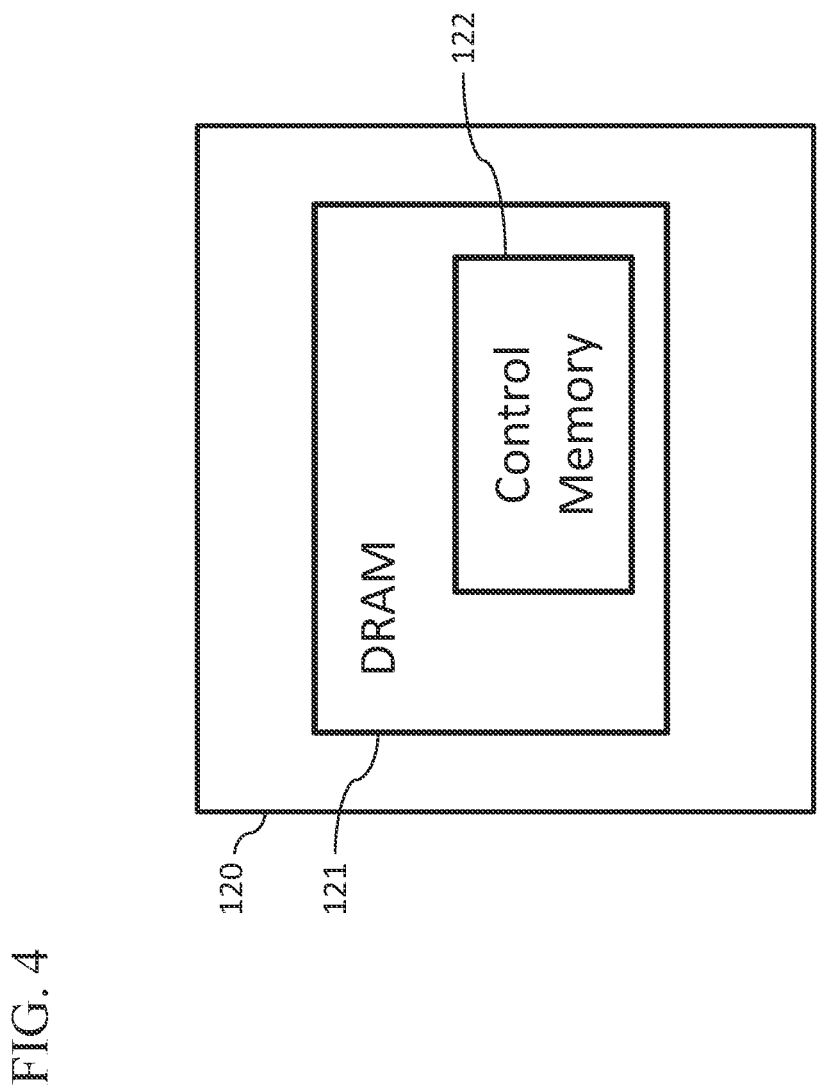
FIG. 4 is a schematic diagram of a host storage drive according to an embodiment of the present invention.

In some embodiments of the bottom-up configuration, the host device 120 can control logical block addressing (LBA) information and memory buffers at the host drive's control memory buffer 121 (see FIG. 4). In further embodiments, the host drive 120 can manage error and alternate paths and the CPU 110 can subscribe for error flow notifications that are managed by the host drive 120. In some embodiments, the host drive 120 may expose errors only on the visible drives as normal error flows to the host CPU 110. In other embodiments, the host drive 120 may make errors on those drives not visible and may only notify the host CPU 110 via special notifications that may require additional software.

In a bottom-up configuration, once the storage drives 120, 220, 320 are put into the peer-to-peer configuration for a policy-based data protection scheme, they will be driven autonomously independent (and in some cases transparent) to the host CPU 110. In the latter case where the storage drives 120, 220, 320 are transparent to the host CPU 110, an external mechanism is needed to discover, configure and modify the protection scheme. This may be achieved through, for example, a separate control plane, a BMC, or a switch management port, to name a few.

Once the peer-to-peer connection is established, whether by the top-down or bottom-up configuration, the host drive 120 includes software that can instruct the one or more remote storage devices 220, 320 on the other storage servers 200, 300 to be aware of the host drive 120. The software may store in the control memory buffer 122 of a DRAM 121 of the host storage device 120, as shown in FIG. 4. The control memory buffer 122 is an NVMe drive definition which is a portion of the host drive's DRAM 121 memory that can be exposed to the host CPU 110 for data transfer mechanisms in embodiments of the current invention. The CMB can be used to share control and data payload packets. The notification itself is transport specific, e.g., TLPs for PCIe. This organization allows a portion of the control memory buffer 122 of the host drive 120 to perform as a replication and data transfer staging area. The control memory buffer 122 can be used by the host drive 120 to expose the data payload and synchronization memory pointers. The host drive 120 will coordinate with the one or more remote storage devices 220, 320 with its buffer management options and control, and the one or more remote storage devices 220, 320 will respond similarly. The host drive 120 will expose its buffer management scheme and its synchronization method in this way, implementing an effective buffer management. However, these mechanisms may not strictly follow the specifications of existing protocols, such as NVMe, and thus may be implemented as private or vendor specific protocols.

This peer-to-peer connection effectively offloads the host CPUs 110, 210, 310, reducing host CPU computing requirements and helping to lower storage system latency as a result of reduced storage server CPU involvement in data transfers.

Figure 5:
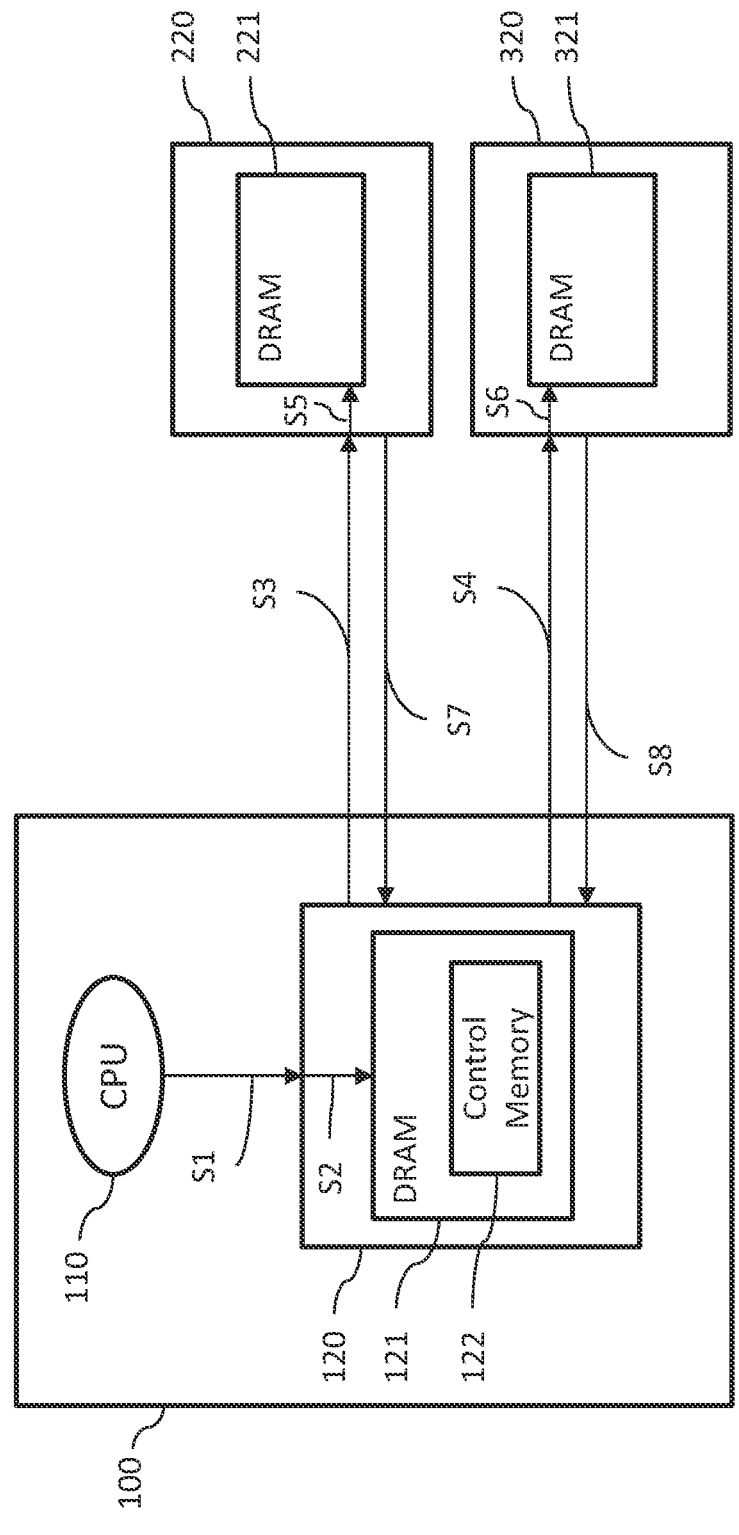
FIG. 5 is a flowchart depicting a method for storing data using the drive-to-drive storage system of FIG. 2 or FIG. 3.

FIG. 5 is a flowchart depicting a method for storing data using the drive-to-drive storage system of FIG. 2 or 3. To locally back-up data, the CPU 110 of node 100 stores data in the host drive 120 in a manner similar to that described above regarding FIG. 1. The CPU 110 issues a write command (S1) to the host drive 120. The data to be stored is first cached in a local DRAM 130 of node 100 before being stored in the host drive 120.

To store data remotely (i.e. to store data on storage drives 220, 320), when the CPU 110 issues a write command (S1) to the host drive 120, the host drive 120 uses a direct memory access (DMA) request to the host CPU 110 to send (S2) the data to be written to its DRAM 121, thus triggering the data currently in the host server's DRAM 130 to be written in the control memory buffer 122 of the host drive's DRAM 121. The host drive 120 also triggers (S3, S4) a notification to one or more remote drives 220, 320 with information regarding the data to be written, its location and offset within the control memory buffer 112, and additional details such as Namespace/LUN, LBA offset, number of bytes, and/or any other information regarding the data that may be needed to initiate storage. The notification itself can be a wire message between the host drive 120 and the remote drives 220, 320. The host drive 120 also sets a flag (for example, the host drive 120 can increment a reference count for each remote drive 220, 320 it will write data to according to policy-based data protection scheme) indicating that the associated memory block(s) is referenced and should not be prematurely dereferenced for its own tracking.

The one or more remote drives 220, 320 use the received information to construct and issue (S5, S6) a DMA request to their respective memory (221, 331) from the host drive control memory buffer 121 using the given information. The provided information (e.g., Namespace/LUN, LBA, number of bytes, etc.) may also be provided in the DMA requests as a header before the data buffer.

Once an individual DMA completes, thus completing the remote storage, the associated one or more remote drives 220, 320 signal (S7, S8) the completion to the host drive 120, allowing the host drive 120 to decrement the reference count in the control memory buffer 122. This may occur using a separate call or by DMA operations directly manipulating host drive memory pointers atomically.

The entire process as described above regarding FIG. 5 may proceed transparently to the storage server nodes 100, 200, 300.

In the above embodiments, the remote drives 220, 320 need not have enabled CMB. However, if remote drives 220, 320 have CMBs and they are enabled, those respective CMBs can be used in the above-described push model to replicate the payload by the host drive 120.

In other embodiments, data distribution may be achieved in other ways, such as by a daisy-chain or torus manner instead of a host drive to one or more remote drives. Both daisy-chain and torus topologies are switchless interconnects. In a daisy-chain model, the drives are connected in series, with the host drive 120 connected to a first remote storage drive (e.g., the remote drive 220), the first remote storage drive connected to the next remote storage drive (e.g., the remote drive 320), and so forth for any number of storage drives included in the system. Drive-to-drive communication is direct and need not follow a standards based protocol. Connections such as USB, FireWire, Thunderbolt and Ethernet are other examples used in a daisy-chain.

In a torus topology, each storage drive is directly connected to more than one of the other storage drives in a parallel system configuration and without a switch in between (1D, 2D, 3D, ND) the drives. For example, in an embodiment of this configuration, the host drive 120 is connected to both remote storage drives 220 and 320, the storage drive 220 is connected to the host drive 120 and the remote storage drive 320, and the remote storage drive 320 is connected to both the host drive 120 and the remote storage drive 220. With sufficient configuration and endpoint information of the data protection cluster available at each drive, data can be dispersed between them in a more efficient manner. The cost can also be decreased in such a topology due to reduced hardware requirements. In addition, the close proximity of the drives in this configuration, can lead to decreased latency and to scaling benefits.

In further embodiments, the drives 120, 220, 320 may additionally construct a private network outside the control and even outside the view of storage server CPUs 110, 210, 310. Choosing an existing communication protocol can require adhering to all the requirements of the existing protocol, including corner cases and error conditions, which can require additional hardware/firmware resources in the host drive. However, if the host drive and the one or more remote storage drives are from one vendor, then some of the existing protocol restrictions can be relaxed by using a vendor-specific method that is not constrained. Examples of such private definitions are public NVMe over Fabrics (NVMe-oF) definitions and vendor specific implementations of NVMe, such as NVMe over Ethernet and NVMe over Network vendor specific implementations. For PCIe, MCTP over PCI Express can be redefined into a vendor-specific implementation by removing the DMFT specific definitions and its required compatibility, timing specifications. This makes it a stripped down version of the original definitions tailored for usage with embodiments of the present invention. In other embodiments, a network interconnect may be used to enable the host drive to talk directly to peered remote drive(s). This private network can likewise be streamlined with vendor specific definitions.

Thus, private device connectivity as shown in the above examples can be made vendor specific and unconstrained by public specifications allowing vendor-specific drive methods to communicate information more effectively between storage devices as compared to currently used protocol transfers, thereby providing consistent performance.

In addition, with a vendor specific transport definition between peer storage drives, the drive can expose its atomicity down to the SSD's FTL layer and its Logical-to-Physical mapping (L2P) commit. For replication, when a sample payload arrives at the host drive, it can delay the update to its mapping till all peered remote drives have synchronized to that write request. There will be an additional synchronization related message to update the flash L2P mapping that goes back to the peers if all of them have successfully committed the write. This is possible because the drive does not expose its internal configuration definition to external software and keeps it hidden between its peers and the vendor peers its IP on drive layout intact. This is one way atomicity can be achieved. Further, the above embodiments provide atomicity between data protection sample sets such as replication sample sets.

The above embodiments provide a host storage device and method to allow the storage devices to address each other directly, without an intervening CPU, thereby offloading data movement activities that typically engage the server CPU. By offloading storage server CPUs, the storage servers can potentially support a greater number of storage devices or the power of the CPUs can be decreased and still support the same number of storage devices. The above embodiments also simplify host software coordination between multiple drives, and the host software does not affect I/O performance and latency metrics once the storage device synchronization is setup, as the storage drives can perform data transfers without further involving the host system.

Possible usages of the embodiments of the present invention include, but are not limited to, data replication, snapshots for direct data, and Key Value type usages for indirect data.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed by appended claims and equivalents thereof.

What is claimed is:

1. A storage system comprising:
a first storage drive comprising memory; and
a second storage drive comprising memory, and connected to the first storage drive,
wherein the first storage drive is configured to:
receive a write command;
store data corresponding to the write command in the memory of the first storage drive;
provide location information of the data stored in the memory of the first storage drive to the second storage drive; and
transfer the data from the memory of the first storage drive to the memory of the second storage drive in response to a request from the second storage drive based on the location information.

2. The system of claim 1, wherein the request is a direct memory access request.

3. The system of claim 1, wherein the write command is received from a server comprising server memory, and the first storage drive is further configured to retrieve the data corresponding to the write command from the server memory.

4. The system of claim 3, wherein to retrieve the data from the server memory, the first storage drive is further configured to issue a direct memory access request to the server to trigger the data to be written from the server memory to the memory of the first storage drive.

5. The system of claim 1, wherein the first storage drive is a Solid State Drive (SSD), and the memory of the first storage drive is dynamic random access memory.

6. The system of claim 1, wherein:
the first storage drive comprises a first interface, and a second interface distinct from the first interface;
the first storage drive is configured to communicate with a server using the first interface; and
the first storage drive is configured to communicate with the second storage drive using the second interface.

7. The system of claim 1, wherein the first storage drive is further configured to set a flag indicating that the second storage drive is referenced for the transferring of the data.

8. The system of claim 1, wherein the first storage drive is further configured to receive a completion signal from the second storage drive, indicating that the transferring of the data is complete.

9. The system of claim 7, wherein the first storage drive is further configured to dereference the second storage drive in response to the completion signal.

10. A storage drive comprising:
a storage processor; and
memory storing instructions that, when executed by the storage processor, cause the storage processor to:
receive a write command;
store data corresponding to the write command in the memory of the storage drive;
provide location information of the data stored in the memory of the storage drive to a second storage drive connected to the storage drive; and
transfer the data from the memory of the storage drive to a memory of the second storage drive in response to a request from the second storage drive based on the location information.

11. The storage drive of claim 10, wherein the request is a direct memory access request.

12. The storage drive of claim 10, wherein the write command is received from a server comprising server memory, and the instructions further cause the storage processor to retrieve the data corresponding to the write command from the server memory.

13. The storage drive of claim 12, wherein to retrieve the data from the server memory, the instructions further cause the storage processor to issue a direct memory access request to the server to trigger the data to be written from the server memory to the memory of the storage drive.

14. The storage drive of claim 10, wherein the storage drive is a Solid State Drive (SSD), and the memory of the storage drive is dynamic random access memory.

15. The storage drive of claim 10, wherein:
the storage drive comprises a first interface, and a second interface distinct from the first interface;
the storage drive is configured to communicate with a server using the first interface; and
the storage drive is configured to communicate with the second storage drive using the second interface.

16. The storage drive of claim 10, wherein the instructions further cause the storage processor to set a flag indicating that the second storage drive is referenced for the transferring of the data.

17. The storage drive of claim 10, wherein the instructions further cause the storage processor to receive a completion signal from the second storage drive, indicating that the transferring of the data is complete.

18. The storage drive of claim 17, wherein the instructions further cause the storage processor to dereference the second storage drive in response to the completion signal.

19. A method for storing data from a first storage drive to a second storage drive connected to the first storage drive, comprising:
receiving, by the first storage drive, a write command;
storing, by the first storage drive, data corresponding to the write command in memory of the first storage drive;
providing, by the first storage drive, location information of the data stored in the memory of the first storage drive to the second storage drive; and
transferring, by the first storage drive, the data from the memory of the first storage drive to the memory of the second storage drive in response to a request from the second storage drive based on the location information.

20. The method of claim 19, wherein the request is a direct memory access request.

\* \* \* \* \*